(12) United States Patent
Kokubo et al.

(10) Patent No.: US 8,814,234 B2
(45) Date of Patent: Aug. 26, 2014

(54) VEHICLE BUMPER BEAM AND METHOD FOR MANUFACTURING SAME

(75) Inventors: Sadao Kokubo, Oyama (JP); Yasuji Kawamata, Oyama (JP); Satoshi Yamaguchi, Oyama (JP)

(73) Assignee: Showa Denko K.K., Tokyo (JP)

( * ) Notice: Subject to any disclaimer, the term of this patent is extended or adjusted under 35 U.S.C. 154(b) by 151 days.

(21) Appl. No.: 13/502,560

(22) PCT Filed: Oct. 18, 2010

(86) PCT No.: PCT/JP2010/068240
§ 371 (c)(1),
(2), (4) Date: Jun. 15, 2012

(87) PCT Pub. No.: WO2011/049029
PCT Pub. Date: Apr. 28, 2011

(65) Prior Publication Data
US 2012/0267908 A1    Oct. 25, 2012

(30) Foreign Application Priority Data

Oct. 19, 2009 (JP) ................................. 2009-240044

(51) Int. Cl.
*B60R 19/34* (2006.01)

(52) U.S. Cl.
CPC ...................................... *B60R 19/34* (2013.01)
USPC .......... 293/133; 293/155; 29/522.1; 29/897.2

(58) Field of Classification Search
USPC ............. 296/187.09, 187.11, 193.09, 193.08, 296/29; 293/133, 154, 155; 29/897.2, 505, 29/507, 512, 522.1, 523; 285/382.5, 285/382.7; 138/106
See application file for complete search history.

(56) References Cited

U.S. PATENT DOCUMENTS 6,554,333 B2 * 4/2003 Shimotsu et al. .............. 293/132
6,813,818 B2 * 11/2004 Schmidt ....................... 29/419.2
(Continued)

FOREIGN PATENT DOCUMENTS

CN         1681689 A       10/2005
DE    195 17 918 A1       11/1996
(Continued)

OTHER PUBLICATIONS

Official Communication issued in corresponding German Patent Application No. 11 2010 006 033.9, mailed on Jul. 3, 2013.

(Continued)

*Primary Examiner* — Jason S Morrow
(74) *Attorney, Agent, or Firm* — Keating & Bennett, LLP

(57) ABSTRACT

A bumper beam of the present invention is provided with a tubular bumper reinforcement member (1) and a tubular crush box (2). A reinforcement member hole (15) is provided in an outer peripheral wall (11) of the bumper reinforcement member (1) in a penetrated manner. A partition wall (22) is provided so as to bridge opposed inner wall surfaces of an outer peripheral wall (21) of the crush box (2). The tip end portion of the crush box (2) is arranged so as to penetrate the reinforcement hole (15). In this state, ridge portions (25a, 25b) are formed, by means of a tube expansion process using a tube expansion die, on the crush box (2) so as to extend in a circumferential direction thereof at a front side and a rear side of the reinforcement hole (15). With this, the crush box (2) is secured to the bumper reinforcement member (1). According to the present invention, the bumper beam can be reduced in size and weight.

8 Claims, 12 Drawing Sheets

(56) References Cited

U.S. PATENT DOCUMENTS

| | | | |
|---|---|---|---|
| 7,393,030 | B2 | 7/2008 | Steeg et al. |
| 8,156,630 | B2* | 4/2012 | Miyazaki et al. ............ 29/522.1 |
| 8,496,287 | B2* | 7/2013 | Matsuura et al. ........ 296/187.09 |
| 2006/0284432 | A1 | 12/2006 | Hashimoto et al. |
| 2010/0019518 | A1* | 1/2010 | Stewart et al. ................ 293/133 |
| 2010/0289300 | A1 | 11/2010 | Kokubo |
| 2010/0295296 | A1 | 11/2010 | Kawamata |

FOREIGN PATENT DOCUMENTS

| | | |
|---|---|---|
| DE | 60 2005 004 442 T2 | 1/2009 |
| DE | 10 2008 029 634 A1 | 8/2009 |
| JP | 04-008818 A | 1/1992 |
| JP | 2002-249067 A | 9/2002 |
| JP | 2004-216975 A | 8/2004 |
| JP | 2004-237902 A | 8/2004 |
| JP | 2004-352092 A | 12/2004 |
| JP | 2005-007475 A | 1/2005 |
| JP | 2006-007979 A | 1/2006 |
| JP | 2006-96229 A | 4/2006 |
| JP | 2007-153163 A | 6/2007 |
| JP | 2007-222877 A | 9/2007 |
| JP | 2007-283323 A | 11/2007 |
| JP | 2007-284039 A | 11/2007 |
| JP | 2008-068849 A | 3/2008 |
| JP | 2008-074235 A | 4/2008 |
| JP | 2008-308170 A | 12/2008 |
| JP | 2009-050875 A | 3/2009 |
| JP | 2009-107005 A | 5/2009 |
| WO | 2009/057673 A1 | 5/2009 |

OTHER PUBLICATIONS

Official Communication issued in International Patent Application No. PCT/JP2010/068240, mailed on Dec. 7, 2010.

Official Communication issued in corresponding Chinese Patent Application No. 201080047265.7, mailed on Jan. 6, 2014.

* cited by examiner

VEHICLE BUMPER BEAM AND METHOD FOR MANUFACTURING SAME

TECHNICAL FIELD

The present invention relates to a vehicle bumper beam to be mounted on, for example, at a front end or a rear end of a vehicle, and also relates to a method for manufacturing the vehicle bumper.

BACKGROUND TECHNIQUE

A bumper is mounted on a front end portion of a vehicle. The bumper is provided, inside thereof, with a bumper beam for absorbing impact at the time of collision.

A bumper is normally provided with a bumper reinforcement member to be mounted on a front of a vehicle so as to extend in a vehicle width direction and a pair of right and left crush boxes for supporting the bumper reinforcement member on a vehicle structure. The bumper beam is configured to be deformed itself to thereby absorb collision energy. Absorbing the collision energy results in reduced damages of vehicle parts other than the bumper beam.

In such a bumper beam, a bumper reinforcement member and a crush box are usually secured with each other by welding or bolting. Fixing the bumper reinforcement member and the crush box by welding may sometimes increase in cost. Fixing the bumper reinforcement member and the crush box by bolding may sometimes result in unexpected shear fracture at the time of collision.

To solve the problems, conventionally proposed is a method of fixing a bumper reinforcement member and a crush box not by means of welding or bolting.

In a bumper shown in the following Patent Document 1 for example, through-holes are formed so as to penetrate a bumper reinforcement member. With a crush box arranged in the through-holes in a penetrated manner, the crush box is subjected to a tube expanding process by means of electromagnetic forming. With this, the bumper reinforcement member and the crush box are secured with each other.

PRIOR ARTS

Patent Documents

Patent Document 1: Japanese Unexamined Laid-open Patent Application Publication No. 2008-68849 (JP-A-2008-68849)

SUMMARY OF THE INVENTION

Problems to be Solved by the Invention

In the conventional bumper beam disclosed by the aforementioned Patent Document 1, however, since the crush box is expanded in diameter by means of electromagnetic forming, a conventional bumper beam was restricted in cross-sectional shape. For this reason, in a conventional bumper beam, there was no other choice to employ a crush box simple in cross-sectional shape, such as, e.g., a crush box circular in cross-sectional shape. Needless to say, a crush box greatly changes in impact absorbing characteristics depending on its shape. When the cross-sectional shape of the crush box is restricted, it becomes difficult to improve the strength, etc., by changing the shape. Therefore, in a conventional bumper beam, in order to attain desired strength, it was required to enlarge the outer diameter of the crush box or to increase the wall thickness of the crush box. Thus, there was a problem that a conventional beam caused an increased size and/or weight.

The preferable embodiment of the present invention was made in view of the aforementioned problems and/or other problems of the related technologies, and can significantly improve the existing method and/or device.

The present invention was made in view of the aforementioned problems and aims to provide a vehicle bumper beam capable of reducing the size and weight and a method of manufacturing the vehicle bumper beam.

Other objects and advantages of the present invention will be apparent from the following preferable embodiments.

Means for Solving the Problems

In order to solve the aforementioned objects, the present invention has the following means.

[1] A vehicle bumper beam equipped with a hollow tubular bumper reinforcement member to be arranged along a vehicle width direction and a hollow tubular crush box to be arranged along a fore and aft direction and having a tip end portion configured to support the bumper reinforcement member, characterized in that a reinforcement member hole is formed in the bumper reinforcement member so as to penetrate at least a part of an outer peripheral wall of the bumper reinforcement member in the fore and aft direction, a partition wall is formed in the crush box so as to bridge opposed inner wall surfaces of an outer peripheral wall of the crush box, and the crush box is secured to the bumper reinforcement member by forming reinforcement member side ridge portions on the crush box at a front side and a rear side of the reinforcement member hole so as to extend in a circumferential direction by a tube expanding process using a tube expanding die with the tip end portion of the crush box penetrating the reinforcement member hole.

[2] The vehicle bumper beam as recited in the aforementioned item 1, wherein the vehicle bumper beam is further provided with a bumper stay for supporting a basal end portion of the crush box, wherein the bumper stay is provided with a stay hole penetrating the bumper stay in the fore and aft direction, and wherein the crush box is secured to the bumper stay by forming stay side ridge portions on the crush box at a front side and a rear side of the stay hole so as to extend in a circumferential direction by a tube expanding process using a tube expanding die with the basal end portion of the crush box penetrating the stay hole.

[3] The vehicle bumper beam as recited in the aforementioned item 1 or 2, wherein the reinforcement member hole is formed in each of a front wall and a rear wall of the outer peripheral wall of the bumper reinforcement member, and the tip end portion of the crush box is arranged in both the two reinforcement member holes in a penetrated manner, and wherein the reinforcement member side ridge portions of the crush box are formed at a front side of at least one of the two reinforcement member holes and at a rear side of the at least one of the two reinforcement member holes.

[4] The vehicle bumper beam as recited in the aforementioned item 3, wherein the reinforcement member side ridge portions of the crush box are formed at the front side and the rear side of each of the two reinforcement member holes.

[5] The vehicle bumper beam as recited in the aforementioned item 1 or 2, wherein the reinforcement member hole is provided only in a rear wall of the outer peripheral wall of the bumper reinforcement member.

[6] The vehicle bumper beam as recited in any one of the aforementioned items 1 to 5, wherein a partition wall is formed in the bumper reinforcement member so as to bridge opposed inner wall surfaces of the bumper reinforcement member.

[7] The vehicle bumper beam as recited in the aforementioned item 6, wherein the partition wall of the crush box is arranged horizontally at an intermediate portion in an up and down direction, wherein the partition wall of the bumper reinforcement member is arranged horizontally at an intermediate portion in the up and down direction, and wherein the partition wall of the crush box and the partition wall of the bumper reinforcement member are arranged at the same height.

[8] The vehicle bumper beam as recited in any one of the aforementioned items 1 to 7, wherein a deform originating ridge portion protruded in a radially outward direction is formed at an intermediate portion of the crush box in the fore and aft direction so as to extend in the circumferential direction.

[9] The vehicle bumper beam as recited in the aforementioned item 8, wherein the deform originating ridge portion is formed by a tube expanding process using a tube expanding die.

[10] A method of manufacturing a vehicle bumper beam equipped with a bumper reinforcement member to be arranged along a vehicle width direction and a crush box having a tip end portion configured to support the bumper reinforcement member, the method includes:

a step of preparing a bumper reinforcement member as the bumper reinforcement member including a reinforcement member hole penetrating at least a part of an outer peripheral wall in a fore and aft direction;

a step of preparing a crush box as the crush box including a partition wall bridging opposed inner surfaces of an outer peripheral wall; and a step of securing the crush box to the bumper reinforcement member by forming reinforcement member side ridge portions on the crush box at a front side and a rear side of the reinforcement member hole so as to extend in a circumferential direction by a tube expanding process using a tube expanding die with the tip end portion of the crush box penetrating the reinforcement member hole.

[11] The method of manufacturing a vehicle bumper beam as recited in the aforementioned item 10, wherein the method further includes:

a step of preparing a bumper stay including a stay hole penetrating in the fore and aft direction; and a step of securing the crush box to the bumper stay by forming stay side ridge portions on the crush box at a front side and a rear side of the stay hole so as to extend in a circumferential direction by a tube expanding process using a tube expanding die with a basal end portion of the crush box penetrating the stay hole, wherein the reinforcement member side ridge portions and the stay side ridge portions are simultaneously formed with the same tube expanding die.

[12] The method of manufacturing a vehicle bumper beam as recited in the aforementioned item 10 or 11, wherein the method further includes a step of forming a deform originating ridge portion by a tube expanding process using a tube expanding die at an intermediate portion of the crush box in the fore and aft direction, and wherein the reinforcement member side ridge portions and the deform originating ridge portion are simultaneously formed with the same tube expanding die.

Effects of the Invention

According to the vehicle bumper beam of the invention [1], even in the case of a crush box having a partition wall, the crush box can be assuredly secured to the bumper reinforcement member. Thus, according to the vehicle bumper beam of the present invention, it becomes possible to reduce the size and weight while securing desired impact absorbing characteristics.

According to the vehicle bumper beam of the invention [2], a bumper stay can be assuredly secured to the crush box. Furthermore, according to the vehicle bumper stay of the present invention, securing of the bumper stay and the crush box and securing of the crush box and the bumper reinforcement member can be performed at the same tube expanding process. Thus, according to the vehicle bumper beam of the present invention, the productivity can be improved.

According to the vehicle bumper beam of the invention [3] and [4], the crush box can be more assuredly secured to the bumper reinforcement member.

According to the vehicle bumper beam of the invention [5], the crush box can be more assuredly prevented from being protruded frontward of the bumper reinforcement member.

According to the vehicle bumper beam of the invention [6], it becomes possible to assuredly improve the impact absorbing characteristics.

According to the vehicle bumper beam of the invention [7], it becomes possible to more assuredly improve the impact absorbing characteristics.

According to the vehicle bumper beam of the invention [8], it becomes possible to further more assuredly improve the impact absorbing characteristics.

According to the vehicle bumper beam of the invention [9], forming of the deform originating ridge portion and securing of the crush box and the bumper reinforcement member can be performed by the same tube expanding process. Thus, according to the vehicle bumper beam of the present invention, the productivity can be improved.

According to the production method of the vehicle bumper beam of the invention [10], a vehicle bumper beam having the same effects as mentioned above can be produced.

According to the production method of the vehicle bumper beam of the invention [11] and [12], the productivity can be improved.

In the present invention, a fore and aft direction is not defined based on a vehicle advancing direction. In the present invention, the fore and aft direction is defined based on an axial direction of a crush box. In the present invention, a tip end side of a crush box is defined as a "front side," and a basal end side of the crush box is defined as a "rear side."

EMBODIMENTS FOR CARRYING OUT THE INVENTION

<First Embodiment>

Figure 1:
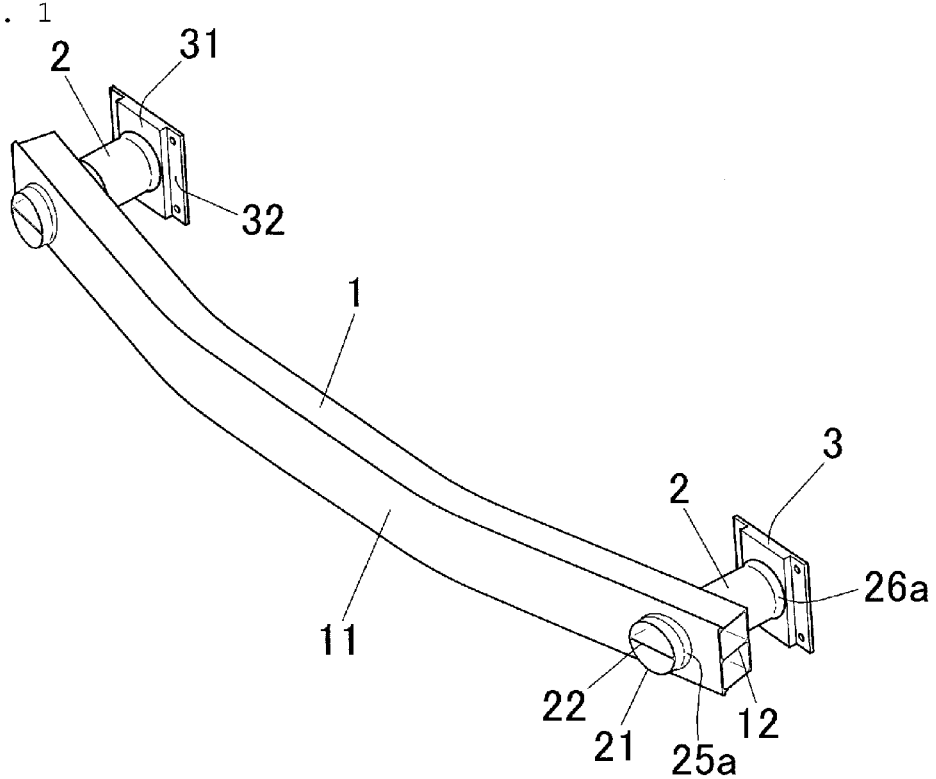
FIG. 1 is a perspective view showing a vehicle bumper beam according to a first embodiment of the present invention.
Figure 2:
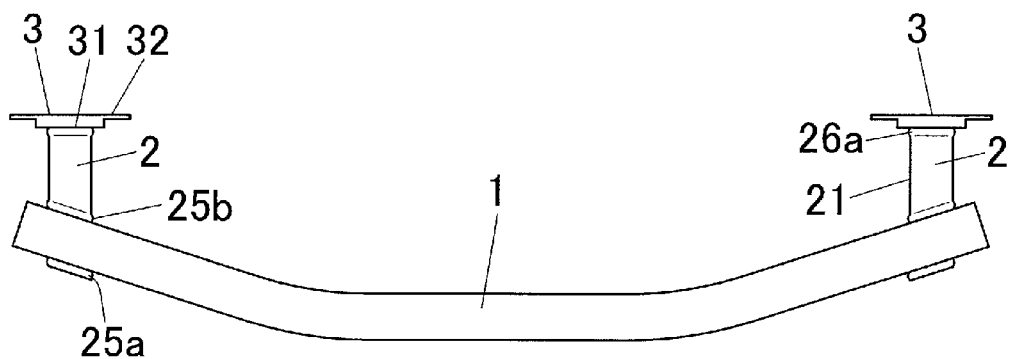
FIG. 2 is a plan view showing the vehicle bumper beam according to the first embodiment of the present invention.
Figure 3:
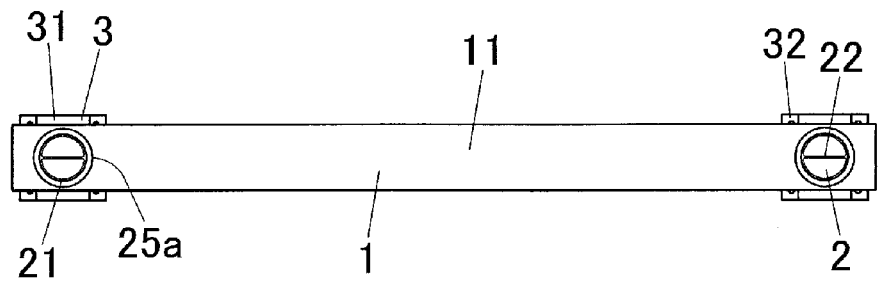
FIG. 3 is a front view showing the vehicle bumper beam according to the first embodiment of the present invention.
Figure 4:
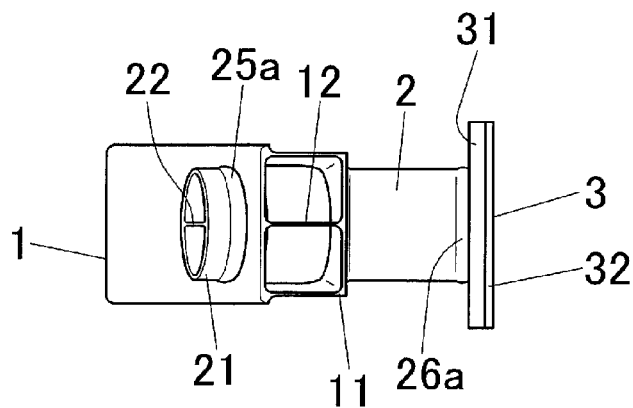
FIG. 4 is a side view showing the vehicle bumper beam according to the first embodiment of the present invention.
Figure 5:
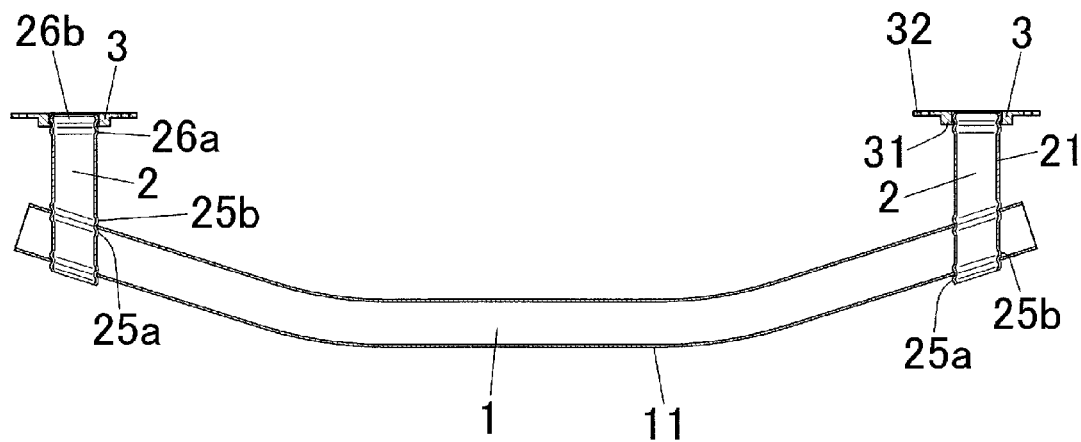
FIG. 5 is a horizontal cross-sectional view showing the vehicle bumper beam according to the first embodiment of the present invention.
Figure 6:
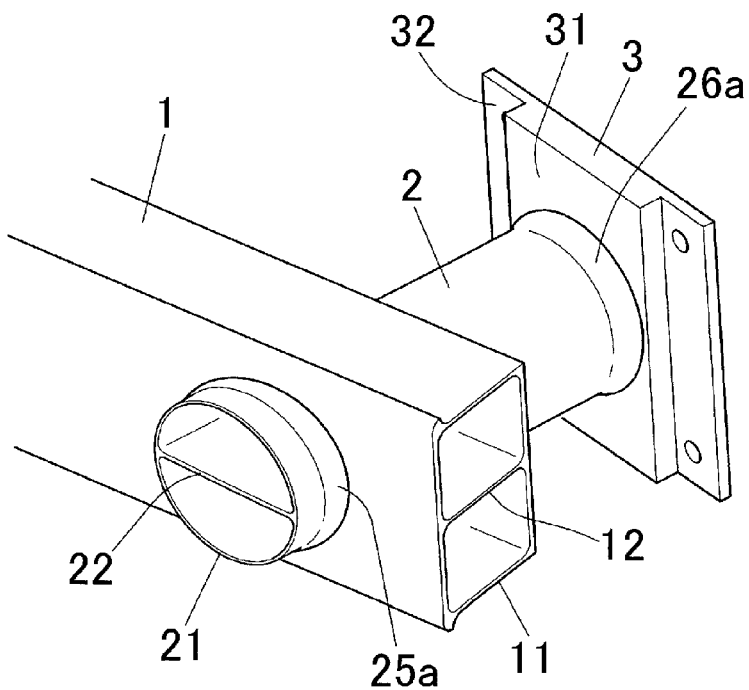
FIG. 6 is an enlarged perspective view showing a side portion of the vehicle bumper beam according to the first embodiment of the present invention.

FIG. 1 is a perspective view showing a vehicle bumper beam according to a first embodiment of the present invention. FIG. 2 is a plan view showing the vehicle bumper of the first embodiment. FIG. 3 is a front view showing the vehicle bumper of the first embodiment. FIG. 4 is a side view showing the vehicle bumper of the first embodiment. FIG. 5 is a horizontal cross-sectional view showing the vehicle bumper of the first embodiment. FIG. 6 is an enlarged side perspective view showing the vehicle bumper of the first embodiment.

Figure 7:
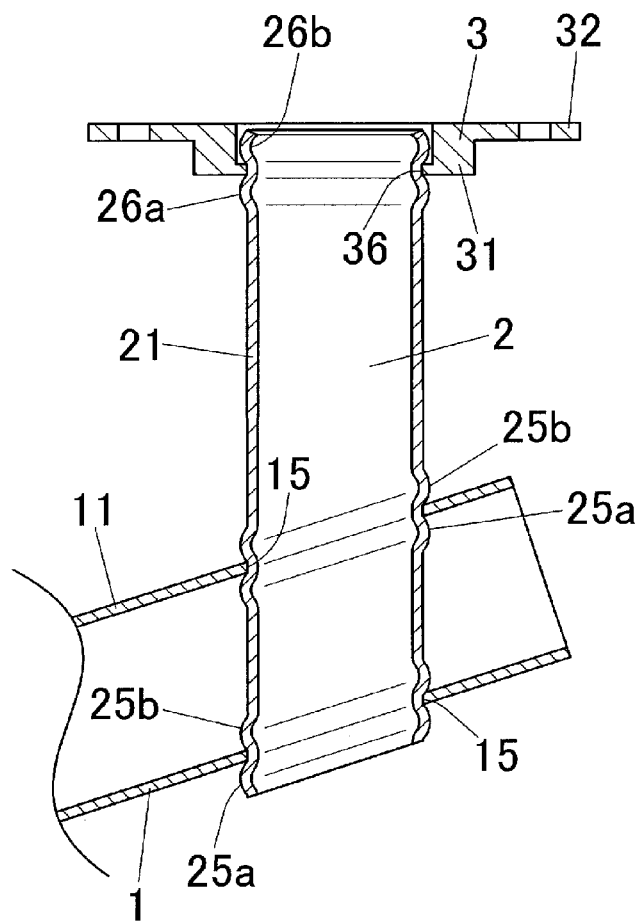
FIG. 7 is an enlarged horizontal cross-sectional view showing the side portion of the vehicle bumper beam according to the first embodiment of the present invention.

FIG. 7 is an enlarged horizontal cross-sectional view of a side portion of the vehicle bumper of the first embodiment.

As shown in these figures, this bumper is attached to a front end of a vehicle to absorb impact at the time of collision. This bumper is provided with a bumper reinforcement member 1, a pair of right and left crush boxes 2, and a pair of right and left bumper stays 3.

In this embodiment, the bumper reinforcement member 1 is constituted by, for example, an extruded member or a drawn member of aluminum or its alloy. However, the bumper reinforcement member of the present invention can also be constituted by a metal plate formed member as will be explained later.

In the bumper reinforcement member 1 of this first embodiment, both side portions in a vehicle width direction are bent rearward. With this, the bumper reinforcement member 1 is formed such that the intermediate portion thereof is slightly protruded forward.

This bumper reinforcement member 1 is provided with a rectangular outer peripheral wall longer in the up and down direction in a cross-sectional shape and a horizontal reinforcing partition wall 12 integrally formed with the outer peripheral wall 11 bridging front and rear walls of the outer peripheral wall 11 at an intermediate position of the outer peripheral wall 11 in the height direction. The bumper reinforcement member 1 is formed into a so-called "B" shape in cross-section. Needless to say, the partition wall 12 is formed so as to continuously extend in a length direction of the bumper reinforcement member 1.

At both longitudinal end portions of the bumper reinforcement member 1, circular reinforcement member holes 15 and 15 are folioed so as to penetrate front and rear walls of the outer peripheral wall 11 in a fore and aft direction.

In this embodiment, the inner surface of the front wall and the inner surface of the rear wall of the bumper reinforcement member 1 constitute opposed inner wall surfaces.

The inner diameter of the reinforcement member hole 15 is formed to be slightly larger than the outer diameter of the crush box 2. The bumper reinforcement member 1 is constituted such that the crush box 2 can be loosely inserted into the reinforcement member hole 15.

In the same manner as mentioned above, the crush box 2 is constituted by, for example, an extruded member or a drawn member of aluminum or its alloy.

This crush box 2 is provided with, in the cross-sectional shape, a circular outer peripheral wall 21 and a horizontal reinforcing partition wall 22 integrally formed with the outer peripheral wall in a bridged manner along the horizontal direction at an intermediate position of the outer peripheral wall 21 in the up and down direction.

In this embodiment, one side inner surface of the outer peripheral surface and the other side inner surface of the outer peripheral surface of the crush box 1 constitute opposed inner wall surfaces.

The tip end portion (front end portion) of the crush box 2 is arranged so as to penetrate the reinforcement member holes 15 and 15 of the front and rear walls of the bumper reinforcement member 1. With this state, as will be explained later, a reinforcement member side ridge portion protruded radially outward in a circumferentially continued manner is formed at both the front and rear sides of the reinforcement member holes 15 and 15. The reinforcement member side ridge portion 25a and 25b are press-fitted to and engaged with the peripheral edge portions of the reinforcement member hole 15 of the bumper reinforcement member 1. Thus, the crush box 2 is fixed to the bumper reinforcement member 1.

In this first embodiment, at both the front and rear sides of the respective reinforcement member holes 15 and 15 formed in the front and rear walls of the bumper reinforcement member 1, the reinforcement member side ridge portions 25*a*, 25*b*, 25*a*, and 25*b* are formed.

The bumper stay 3 is formed by, e.g., a formed or molded member of aluminum or its alloys.

This bumper stay 3 is provided with a connecting plate portion 31 for fixedly supporting a basal end portion of the crush box 2 and flange portions 32 arranged at both sides of the connecting plate portion 31 and configured to be fixed to a vehicle structure. The connecting supporting portion 31 is arranged slightly forwardly of the flange portion 32. The connecting plate portion 31 has a circular stay hole 36 penetrating the center portion of the connecting plate portion in the fore and aft direction.

The stay hole 36 is formed to have an inner diameter slightly larger than the outer diameter of the crush box 2. The bumper stay 3 is configured so that the crush box 2 can be loosely inserted into the stay hole 36.

The basal end portion (rear end portion) of the crush box 2 is inserted into the stay hole 36 of the bumper stay 3. With this inserted state, as will be explained later, the crush box 2 is formed to have stay side ridge portions 26*a* and 26*b* radially outwardly protruded and circumferentially continued at both the front and rear sides of the stay hole 36. The ridge portions 26*a* and 26*b* are press-fitted to and engaged with the peripheral edge portions of the stay hole 36 of the bumper stay 3. Thus, the crush box 2 is fixedly connected to the bumper stay 3.

Next, a method of fixing the crush box 2 to the bumper reinforcement member 1 and the bumper stay 3 will be explained in detail.

In this first embodiment, these bumper beam structural members 1 to 3 are connected with each other by a tube expanding process (expand process). The tube expanding process is performed using a tube expanding die (expand die) 5.

Figure 8A:
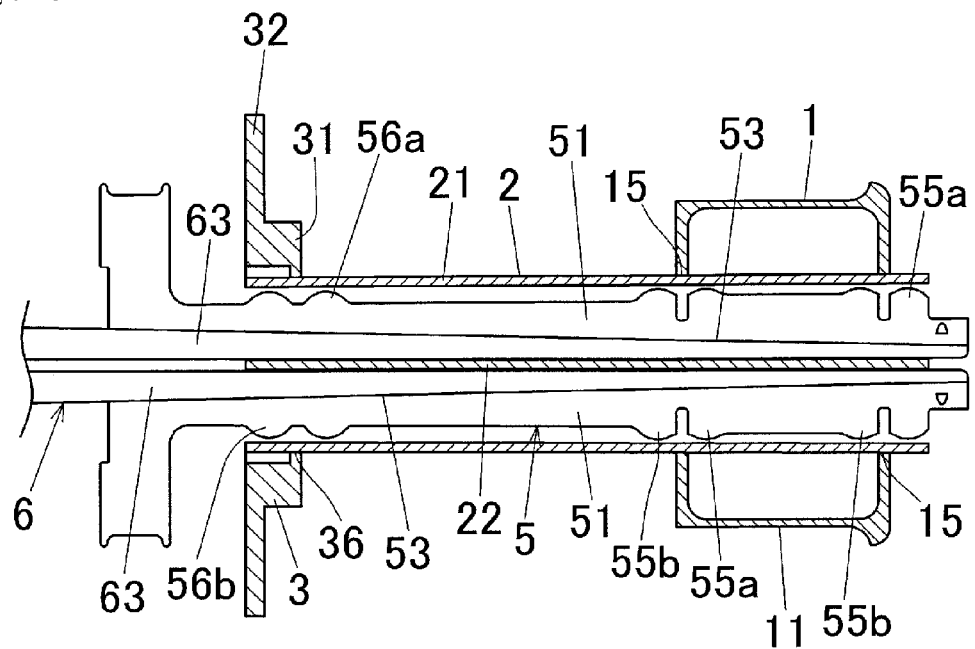
FIG. 8A is a side cross-sectional view showing a crush box and vicinity thereof in a state immediately before performing a tube expanding process in the vehicle bumper beam according to the first embodiment of the present invention.

As shown in FIG. 8A, the tube expanding die 5 used in the first embodiment is provided with upper and lower split dies 51 and 51 to be inserted into the upper and lower sides of the partition wall 22 in the crush box 2, respectively. Each of the split dies 51 and 51 is provided with a plurality of segments (die segments) separated in the circumference direction. Each of the split dies 51 has a half-circular columnar shape corresponding to the shape of the upper or lower side portion of the crush box 2.

The segments of the split dies 51 are the same in structure.

Each of the split dies 51 and 51 has, on its outer peripheral surface thereof, a tip end side pressing protrusions 55*a* and 55*b* at positions corresponding to positions of the crush box 2 where the reinforcement member side ridge portions 25*a* and 25*b* will be formed.

Each of the split dies 51 and 51 is provided with a wedge inserting portion 53 extending in the axial direction. Each wedge inserting portion 53 is formed into a half-cone shape having a half-circle cross-sectional shape or a half-pyramid shape having a half-pyramid cross-sectional shape.

A mandrel 6 for driving the tube expanding die 5 radially outward includes wedges 63 and 63 corresponding to the wedge inserting portions 53 and 53 of the split dies 51 and 51. Each of the wedges 63 and 63 is formed into a taper shape tapered narrower toward the tip end (front side). Each of the wedges 63 and 63 is formed into a half-cone shape having a half-circle cross-sectional shape or a half-pyramid shape having a half-pyramid cross-sectional shape. The taper angle of each wedge 63 is set to be the same as the taper angle of each wedge inserting portion 53.

The wedges 63 and 63 of the mandrel 6 are inserted into the wedge inserting portions 53 and 53 of the split dies 51 and 51 of the tube expanding die 5. The insertion causes the segments of the split dies 51 to be pressed radially outward (in the radially outward direction) with the corresponding wedges 63 and 63.

When fixedly connecting the bumper beam structural members 1 to 3 using the tube expanding die 5, the non-expanded tip end portion (front end portion) of the crush box 2 is arranged in the reinforcement member holes 15 and 15 formed in the fore and aft walls of the bumper reinforcement member 1 in a loosely fitted manner. Further, the basal end portion (rear end portion) of the crush box 2 is arranged in the stay hole 36 of the bumper stay 3 in a loosely fitted manner. Further, the split dies 51 and 51 are inserted into the crush box 2 so as to be arranged at both the upper and lower sides of the stay.

In this state, the scheduled portions (scheduled ridge forming portions) of the crush box 2 where the ridge portions 25*a*, 25*b*, 26*a*, and 26*b* are to be formed are arranged at fore and aft positions of the reinforcement member holes 15 and 15 formed in the front and rear walls of the bumper reinforcement member reinforcement member 1 and at the front and rear positions of the stay hole 36 of the bumper stay 3, respectively. Furthermore, the ridge forming scheduled portions of the crush box 2 are arranged corresponding to the tip end side and the basal end side of the pressing protrusions 55*a*, 55*b*, 56*a*, and 56*b* of the tube expanding die 5. The partition wall 12 of the bumper reinforcement member 1 and the partition wall 22 of the rush box 2 are arranged in a corresponding manner. Both the partition walls 12 and 22 are arranged at the same horizontal plane (at the same height).

Figure 8B:
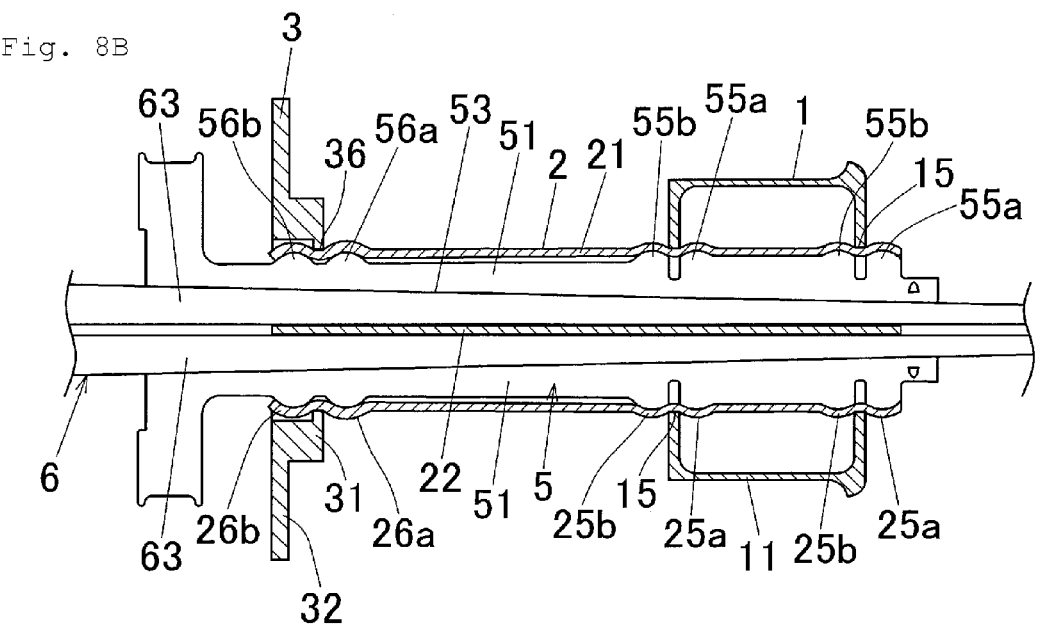
FIG. 8B is a side cross-sectional view showing the crush box and vicinity thereof in a state immediately after performing a tube expanding process in the vehicle bumper beam according to the first embodiment of the present invention.

In this state, as shown in FIG. 8B, the insertion of the mandrel 6 in the axial direction thereof causes forcible insertion of the wedges 63 and 63 into the wedge inserting portions 53 and 53. This causes a radially outward movement of each segment of the sprit die 51 so that the scheduled ridge forming portions of the crush box 2 are subjected to a tube expanding process (expand process).

During this tube expansion process, the crush box 2 is locally expanded with the tip end side and basal end side pressing protrusions 55*a* and 55*b*, 56*a*, and 56*b* of the tube expanding die 5. By the expansions, ridge portions 25*a*, 25*b*, 26*a*, and 26*b* each having a half-circular cross-sectional shape are formed at the fore and aft positions of the reinforcement member holes 15 and 15 of the crush box 2 and at the fore and aft positions of the stay hole 36 along the circumferential direction. The reinforcement member side ridge portions 25*a* and 25*b* are press-fitted to and engaged with the bumper reinforcement member 1 at the fore and aft of the peripheral edge portion thereof. With this, the crush box 2 is connected to the bumper reinforcement member 1 in a state in which the crush box 2 is prevented from being pulled out in the fore and aft direction. Further, the stay side ridge portions 26*a* and 26*b* are press-fitted to and engaged with the bumper stay 3 at the fore and aft of the peripheral edge portion thereof. Thus, the crush box 2 is connected to the bumper stay 3 in a manner such that the crush box 2 is prevented from being pulled out in the fore and aft direction.

Furthermore, at the time of the tube expanding process, the region of the crush box 2 located between the reinforcement member side protrusions 25*a* and 25*b* and the region located between the stay side protrusions 26*a* and 26*b* are slightly expanded together with the ridge portions 25*a*, 25*b*, 26*a* and 26b. As a result, the outer peripheral surface of the crush box 2 is pressed against and secured to both the inner peripheral edge face of the reinforcement member hole 16 and the inner peripheral edge face of the stay hole 36.

Thus, the bumper beam structural members 1 to 3 are strongly connected with each other, resulting in a bumper beam.

As explained above, according to the bumper beam of this first embodiment, the crush box 2 is expanded with the tube expanding die 5 to be connected to the bumper reinforcement member 1. Therefore, the bumper beam of this embodiment gives relatively greater flexibility to the cross-sectional shape of the crush box 2. For example, even in the case of employing a crush box 2 having a reinforcing partition wall 22 like the bumper beam of this embodiment, the crush box 2 can be assuredly fixed to the bumper reinforcement member 1. Therefore, according to the bumper beam of this embodiment, it is not required to increase the thickness or size of the crush box 2 to secure a predetermined strength of the crush box 2. Thus, according to the bumper beam of this embodiment, it becomes possible to reduce the size and weight of the crush box 2. Furthermore, according to the bumper beam of this embodiment, it is possible to reduce the size and weight of the entire bumper beam and also possible to attain the cost reduction.

Further, in the bumper beam of this embodiment, the bumper box 2 having the partition wall 2 is used. Thus, the bumper beam of this embodiment can control the behavior of the crush box 2 (i.e., how the crush box is crushed) at the time of press-deformation due to collision. For this reason, according to the bumper beam of this embodiment, it is possible to assuredly cause the crush box 2 to be press-deformed in an accordion-folded manner at the time of collision. Thus, according to the bumper beam of this embodiment, the difference between the initial load at the time of collision and the average load after the initial load can be reduced. As a result, according to the bumper beam of this embodiment, the energy absorption (EA) efficiency can be improved while increasing the EA amount. Furthermore, according to the bumper beam of this embodiment, ideal impact absorbing characteristics can be obtained.

In the bumper beam of this embodiment, the partition wall 12 of the bumper reinforcement member 1 and the partition wall 22 of the crush box 2 are aligned in height position. Thus, the bumper beam of this embodiment can assuredly absorb the collision energy also by the partition wall 22 of the crush box 2. Thus, the bumper beam of this embodiment can further improve the EA amount.

Furthermore, in the first embodiment, the crush box 2 is simultaneously press-fitted to and engaged with the bumper reinforcement member 1 and the bumper stay 3 by means of a tube expansion process. Thus, according to the bumper beam of this embodiment, at only single step, three bumper beam structural members 1 to 3 can be connected with each other. This enables reduction of the number of steps and improvement of the production efficiency. Furthermore, according to the bumper beam of this embodiment, the cost can be assuredly reduced.

In the bumper beam of this embodiment, the bumper beam structural members 1 to 3 are connected with each other by means of a tube expanding process. In other words, in the bumper beam of this embodiment, those members are not connected by means of welding or bolting. According to the bumper beam of this embodiment, increasing of cost due to welding can be prevented, which in turn can further reduce the cost. Furthermore, according to the bumper beam of this embodiment, unexpected shear fracture due to bolting at the time of collision can also be prevented from being occurred. Accordingly, according to the bumper beam of this embodiment, further improved impact absorbing characteristics can be obtained.

<Second Embodiment>

Figure 9:
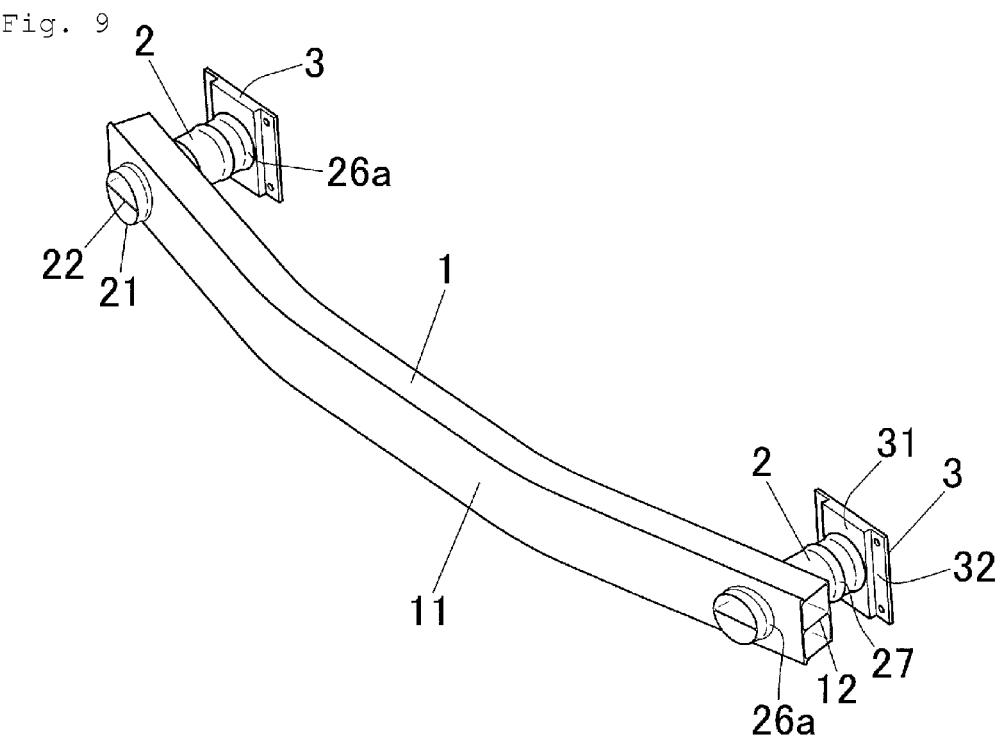
FIG. 9 is a perspective view showing a vehicle bumper beam according to a second embodiment of the present invention.
Figure 10:
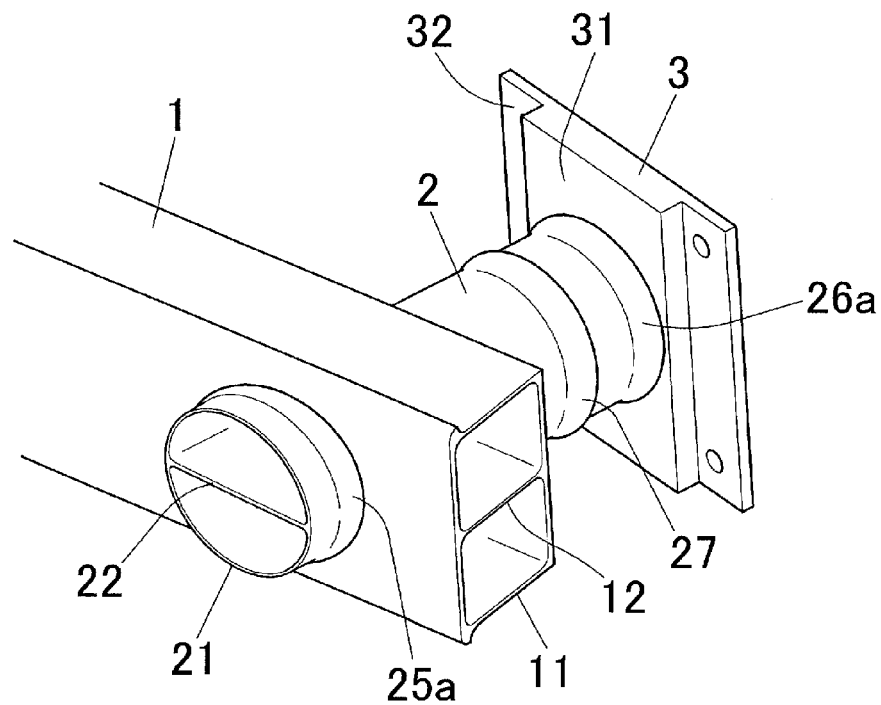
FIG. 10 is an enlarged perspective view showing a side portion of the vehicle bumper beam according to the second embodiment.
Figure 11:
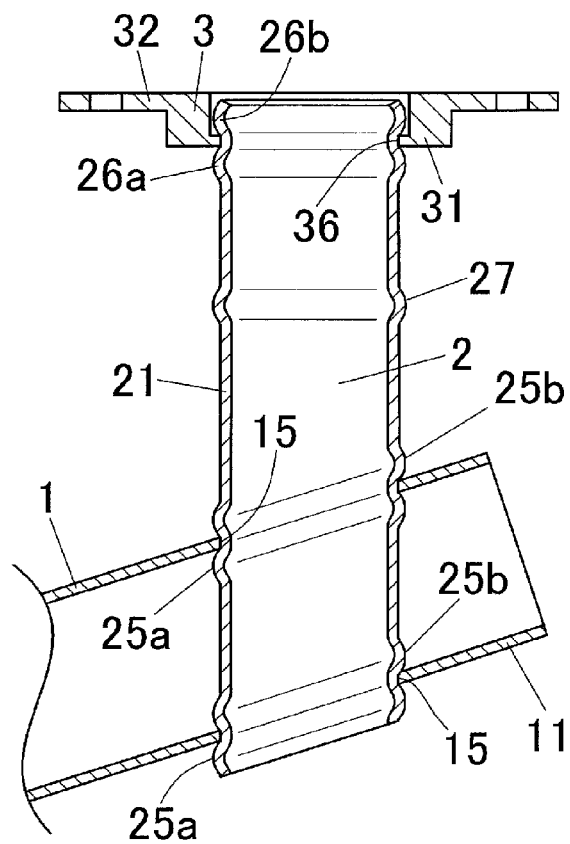
FIG. 11 is an enlarged horizontal cross-sectional view showing the side portion of the vehicle bumper beam according to the second embodiment.

FIG. 9 is a perspective view showing a vehicle bumper beam according to a second embodiment of this invention. FIG. 10 is an enlarged side perspective view showing the vehicle bumper beam of the second embodiment. FIG. 11 is an enlarged horizontal side cross-sectional view showing the vehicle bumper beam of the second embodiment.

As shown in these figures, in this bumper beam, a single deform originating ridge portion 27 continuously extending in a circumferential direction is formed at an intermediate position of the crush box 2 in the length direction (in the axial direction) by a tube expanding process.

In this second embodiment, the other structure is the same as in the aforementioned first embodiment. Accordingly, in this second embodiment, the same reference number will be allotted to the same or corresponding portion in the first embodiment. Thus, in this second embodiment, explanations of this second embodiment overlapping with the explanations of the first embodiment will be omitted.

Also in the second embodiment, in the same manner as in the first embodiment, bumper beam structural members are secured with each other by means of a tube expanding process.

In this embodiment, the deform originating ridge portion 27 is formed simultaneously with the tube expanding process for securing the bumper beam structural members 1 to 3. In detail, as a tube expanding die, a die having a pressing protrusion formed at the position corresponding to the deform originating ridge portion 27 is used. Using this tube expanding die, the reinforcement member side ridge portions 25a and 25b and crush box side ridge portions 26a and 2b of the crush box 2 are press-formed. Simultaneously with this process, the deform originating ridge portion 27 of the crush box 2 is press-formed.

Also in this second embodiment, in the same manner as explained above, the same functions and effects can be obtained.

Furthermore, at the intermediate position of the crush box 2, the deform originating ridge portion 27 is formed. This ridge portion 27 becomes a starting point of crush deformation at the time of collision, which assuredly causes buckling at this portion. Thus, the crush box 2 is more assuredly crushed in an accordion-folded manner. Accordingly, according to the bumper beam of this embodiment, an energy absorption (EA) amount can be assuredly secured in a through stable manner, resulting in further improved impact absorption characteristics.

The deform originating ridge portion 27 is formed simultaneously with the tube expanding process for securing the bumper beam structural members 1 to 3. For this reason, according to the vehicle bumper beam of this embodiment, it is not required to perform a separate process of forming the deform originating ridge portion 27. In other words, according to the vehicle bumper beam of this embodiment, the number of steps is not increased. Accordingly, according to the vehicle bumper beam of this embodiment, it becomes possible to avoid increasing of cost while maintaining the high product efficiency.

<Modifications>

Figure 12:
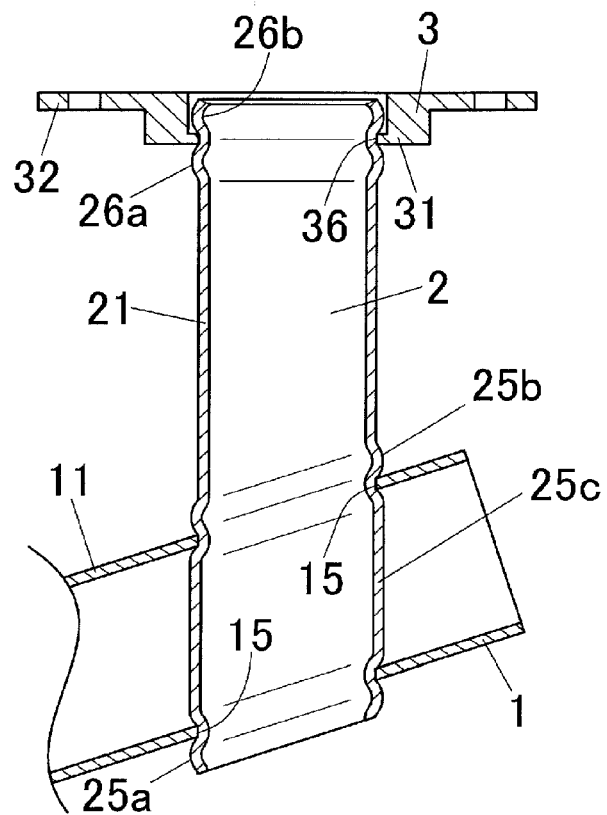
FIG. 12 is an enlarged horizontal cross-sectional view showing a side portion of a vehicle bumper beam according to a first modification of the present invention.

In the aforementioned embodiments, within the bumper reinforcement member 1, reinforcement member side ridge portions 25a and 25b are formed at inner side of the front wall and at the inner side of the rear wall of the bumper reinforcement member 1, respectively. The present invention, however, is not limited to it. In the present invention, as shown in FIG. 12, it can be configured such that a single wide reinforcement member side ridge portion 25c extending from the front wall inner surface of the bumper reinforcement member 1 to the rear wall inner surface of the bumper reinforcement member 1 is formed within the bumper reinforcement member 1.

In the aforementioned embodiments, a total of four reinforcement member side ridge portions 25a and 25b are formed at the fore and aft two positions of the front wall of the bumper reinforcement member 1 and at the fore and aft two positions of the rear wall of the bumper reinforcement member 1. The present invention, however, is not limited to it. In the present invention, it can be configured such that reinforcement member side ridge portions 25a and 25b are formed at at least two positions, at the front side of one of the front and rear walls of the bumper reinforcement member 1 and at the rear side thereof.

Figure 13:
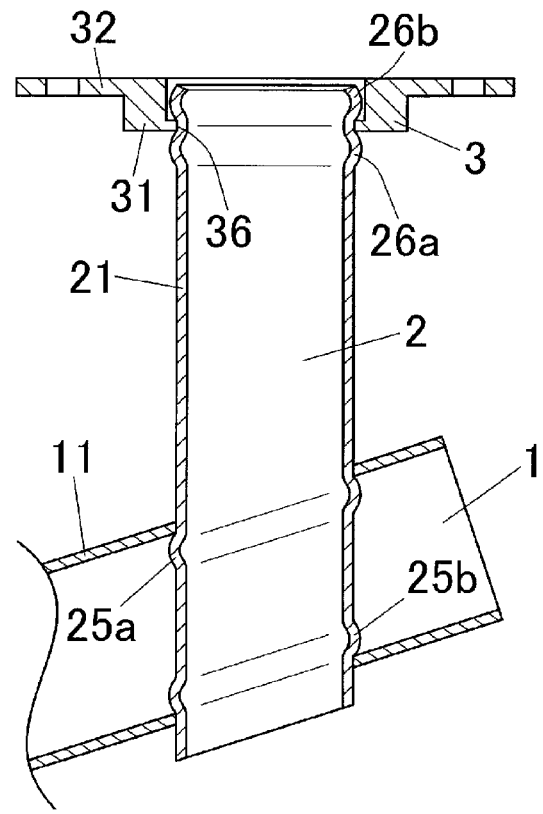
FIG. 13 is an enlarged horizontal cross-sectional view showing a side portion of a vehicle bumper beam according to a second modification of the present invention.
Figure 14:
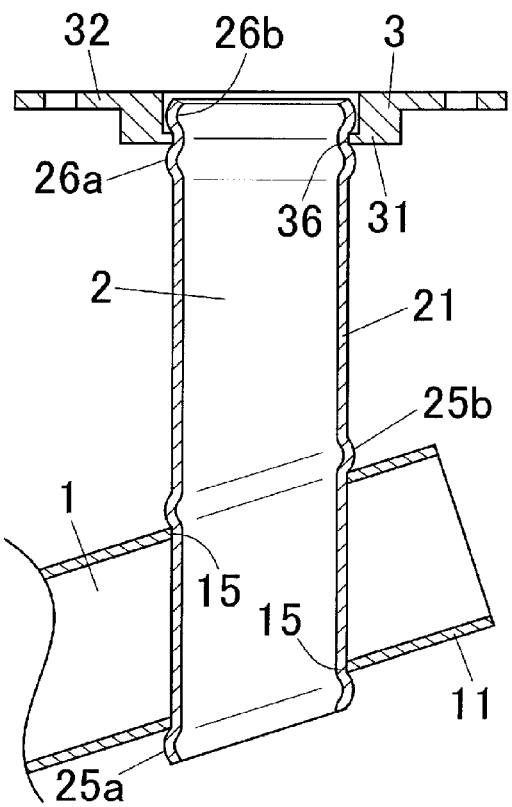
FIG. 14 is an enlarged horizontal cross-sectional view showing a side portion of a vehicle bumper beam according to a third modification of the present invention.
Figure 15:
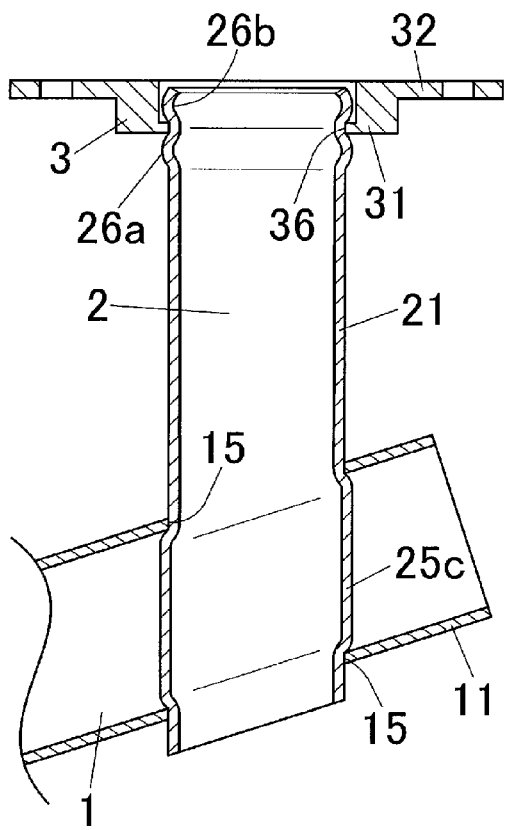
FIG. 15 is an enlarged horizontal cross-sectional view showing a side portion of a vehicle bumper beam according to a fourth modification of the present invention.

For example, as shown in FIG. 13, in the present invention, it can be configured such that ridge portions 25a and 25b are formed at two positions, at the rear side (inner surface side) of the front wall of the bumper reinforcement member 1 and at the front side (inner surface side) of the rear wall of the bumper reinforcement member 1. As shown in FIG. 14, it can be configured such that ridge portions 25a and 25b are formed at two positions, at the front side (outer surface side) of the front wall of the bumper reinforcement member 1 and at the rear side (outer surface side) of the rear wall of the bumper reinforcement member 1. As shown in FIG. 15, in the present invention, it can be configured such that only one wide reinforcement member side ridge portion 25C extending from the front wall inner surface of the bumper reinforcement member 1 to the rear wall inner surface of the bumper reinforcement member 1 is formed within the bumper reinforcement member 1.

In the present invention, the ridge portion can be formed at any position as long as the ridge portion can prevent the crush box from being pulled out in the fore and aft direction of the crush box 2.

Figure 16:
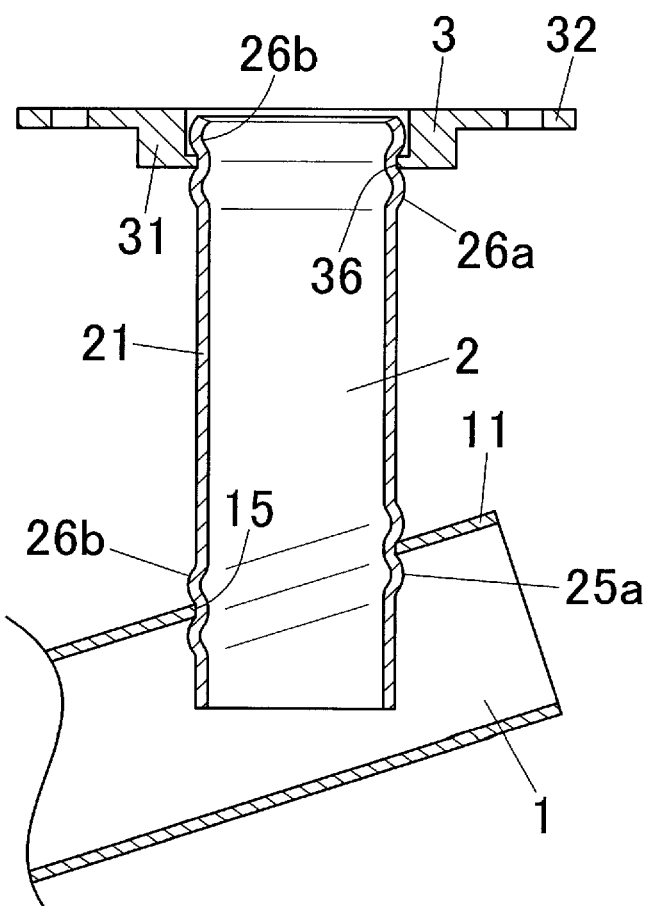
FIG. 16 is an enlarged horizontal cross-sectional view showing a side portion of a vehicle bumper beam according to a fifth modification of the present invention.
Figure 17:
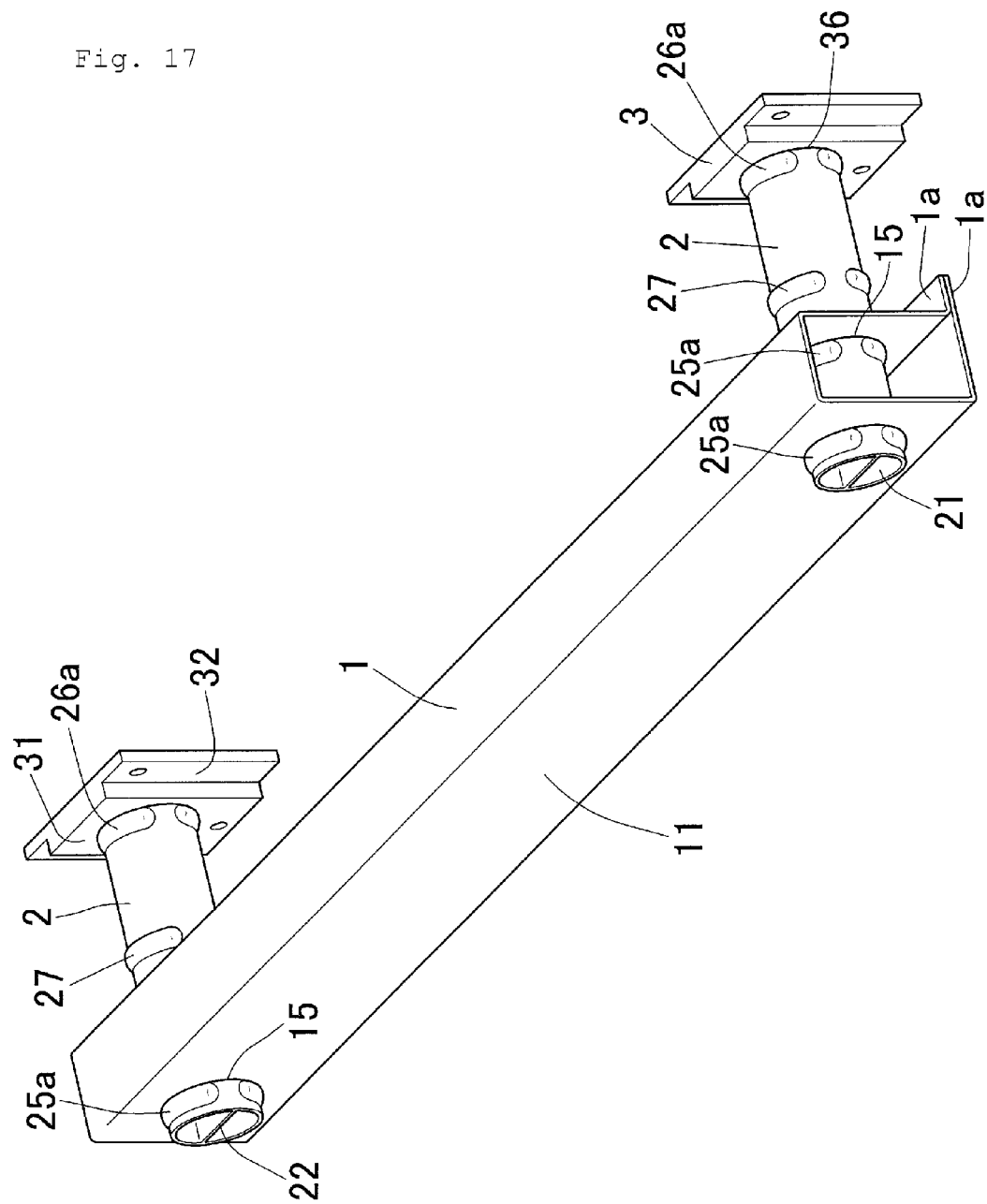
FIG. 17 is a perspective view showing a vehicle bumper beam according to a sixth modification of the present invention.
Figure 18:
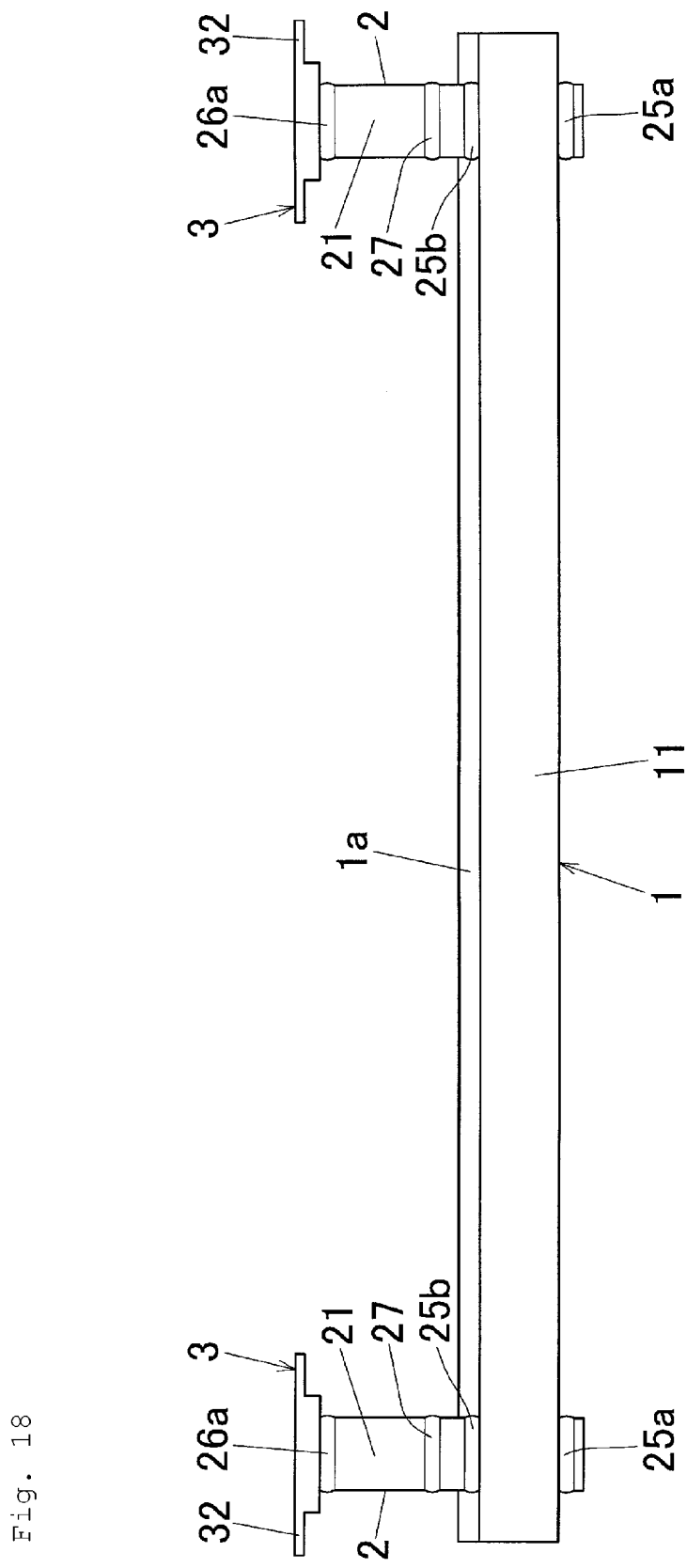
FIG. 18 is a plan view showing the bumper beam according to the sixth modification.
Figure 19:
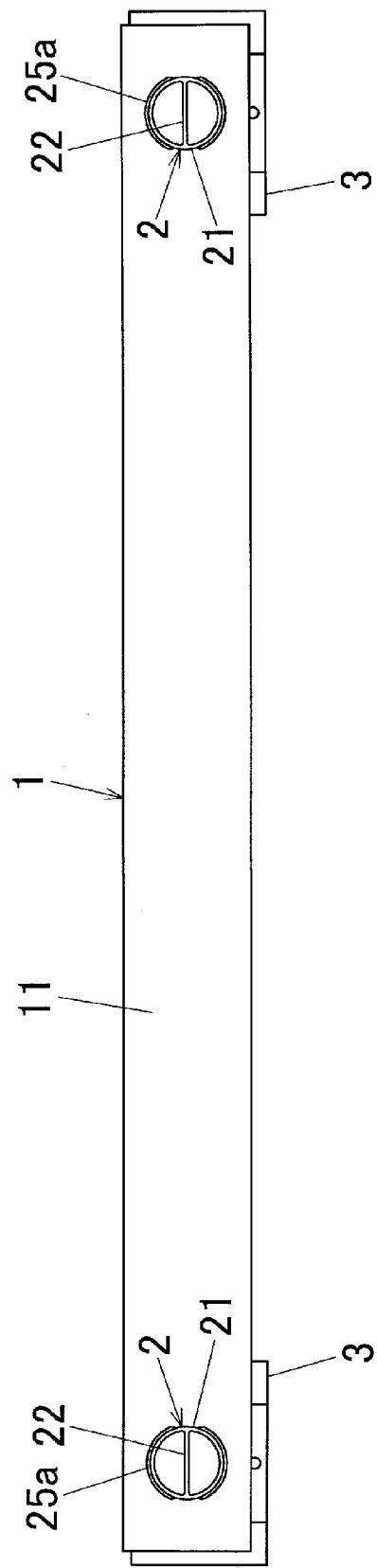
FIG. 19 is a front view showing the bumper beam according to the sixth modification.
Figure 20:
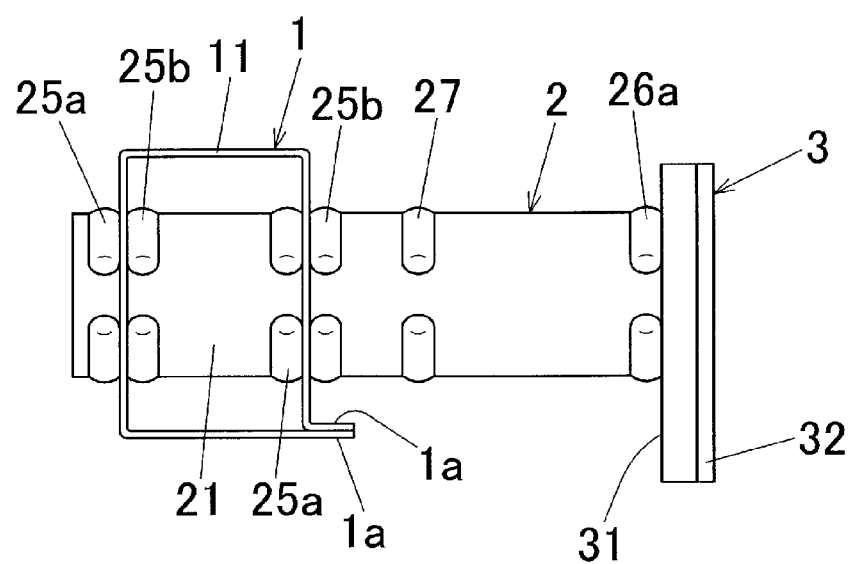
FIG. 20 is a side view showing the bumper beam according to the sixth modification.
Figure 21:
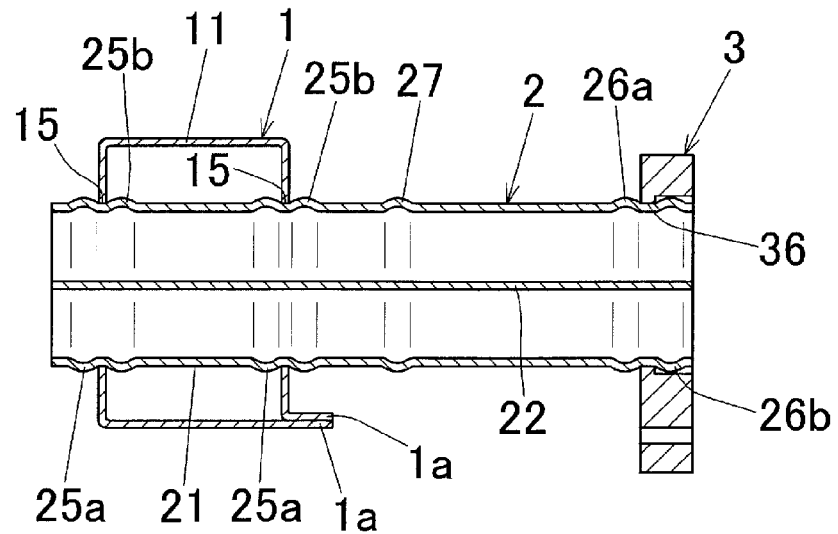
FIG. 21 is a side cross-sectional view showing a crush box and vicinity thereof of the bumper beam according to the sixth modification.

In the aforementioned embodiments, the crush box 2 is arranged so as to penetrate the front and rear walls of the bumper reinforcement member 1. The present invention, however, is not limited to it. For example, as shown in FIG. 16, in the present invention, it can be configured such that the crush box 2 does not penetrate the front, wall of the bumper reinforcement member 1, but penetrates only the rear wall of the bumper reinforcement member 1.

Furthermore, in the aforementioned embodiments, as a bumper reinforcement member, a bumper reinforcement member having an outer peripheral wall rectangular in cross-section is used. The present invention, however, is not limited to it. The present invention allows employing a bumper reinforcement member having another cross-sectional shape. For example, the present invention allows employing a bumper reinforcement member having a triangular cross-sectional shape or a pentagonal or more polygonal cross-sectional shape. Furthermore, the present invention allows employing a bumper reinforcement member having a circular cross-sectional shape, an elliptical cross-sectional shape, or a deformed cross-sectional shape.

Furthermore, with respect to the partition wall provided in the bumper reinforcement member, the number of the partition walls is not limited to 1. Two or more partition walls can be provided.

In the aforementioned embodiments, as a crush box, a crush box having an outer peripheral wall circular in cross-section is used. The present invention, however, is not limited to it. The present invention allows employing a crush box having another cross-sectional shape. For example, the present invention allows employing a crush box having an elliptical cross-sectional shape, a triangular or more polygonal cross-sectional shape, or a deformed cross-sectional shape.

Furthermore, with respect to the partition wall provided in the rush box, the number of the partition walls is not limited to 1. Two or more partition walls can be provided.

In the present invention, a crush box of any shape can be employed as long as it can be subjected to a tube expansion process using a tube expansion die.

In the aforementioned embodiments, the explanations were made while exemplifying the case in which the bumper beam of the present invention was utilized as a bumper inner structural member. The present invention, however, is not limited to it. The bumper beam of the present invention can be applied to a front under lamp protector for a large vehicle.

Needless to say, the bumper beam of the present invention can also be employed as a bumper to be mounted on the vehicle rear end.

In the aforementioned embodiments, the explanations were made while exemplifying the case in which the bumper reinforcement member was constituted by an extruded member or a drawn member. The present invention, however, is not limited to it. In the present invention, it can be configured such that the bumper reinforcement member is constituted by a plate formed member.

For example, in the bumper beam shown in FIGS. 17 to 22, the bumper reinforcement member 1 is constituted by a plate formed member made of a single plate member. That is, this bumper reinforcement member of this modified embodiment is formed by bending a single plate of, e.g., aluminum or its alloy into a rectangular hollow member approximately rectangular in cross-section. In this rectangular hollow member, overlapping portions la and la are formed at the opposed edge portions to be joined at one of the corner portions. The overlapping portions la and la extend continuously in a length direction of the bumper reinforcement member 1 so as to be overlapped with each other. The overlapping portions 1a and 1a of this rectangular hollow member are secured with each other by means of spot welding or hemming in an overlapped manner. With this, a bumper reinforcement member 1 approximately rectangular in cross-section s formed.

This bumper reinforcement member 1 has, at its both side end portions in the length direction thereof, circular reinforcement member holes 15 and 15 penetrating the front and rear walls of the outer peripheral wall 11 of the bumper reinforcement member in the fore and aft direction. The reinforcement member holes 15 and 15 can be formed before or after bending a plate member.

The bumper reinforcement member 1 is secured to the crush box 2 structured in the same manner as in the aforementioned embodiment in the same manner as in the aforementioned embodiment. In detail, the tip end portion of the crush box 2 is arranged in the reinforcement member holes 15 and 15. With this inserted state, by performing a tube expanding process which is similar to the tube expanding process mentioned above, radially outwardly protruded reinforcement member side ridge portions 25a and 25b are formed at both sides of the reinforcement member holes 15 and 15 of the crush box 2. The ridge portions 25a and 25b are press-fitted to and engaged with the inner peripheral edges of the reinforcement member holes 15 and 15 of the bumper reinforcement member 1. Thus, the crush box 2 is secured to the bumper reinforcement member 1.

In the same manner as in the aforementioned embodiments, a bumper stay 3 is attached by a tube expanding process. The bumper stay 3 is attached to a vehicle structure.

At a longitudinal intermediate portion of the crush member 2 between the bumper reinforcement member 1 and the bumper stay 3, deform originating ridge portions 27 are formed by a tube expanding process in the same manner as in the aforementioned second embodiment.

In this modified embodiment, the ridge portions 25a, 25b, 25a, 26b, and 27 are not continued in a circumferential direction differently from the aforementioned first and second embodiments. The ridge portions 25a, 25b, 25a, 26b, and 27 are formed intermittently so as to be divided into two parts in the circumferential direction.

In other words, two ridge portions 25a, 25b, 26a, 26b, 27 each extending in a circumferential direction which is slightly shorter than the ½ circumferential length are formed at upper and lower sides of the crush box 2, respectively.

In this modified embodiment, other structure is the same as that of the aforementioned first and second embodiments. Accordingly, in this modified embodiment, the same reference number will be allotted to the same or corresponding portion in the first and second embodiments. Thus, in this modified embodiment, explanations overlapping with the explanations of the first and second embodiment will be omitted.

Also in this modified embodiment, in the same manner as in the aforementioned first and second embodiments, the same functions and effects can be exerted.

In the aforementioned embodiments and modified embodiment, the explanations were made by exemplifying the case in which the bumper reinforcement member was formed by an extruded member, a drawn molded member, or a plate formed member. In the present invention, however, the material, forming method, shape, etc., of the bumper reinforcement member are not specifically limited. In the present invention, in the case in which the bumper reinforcement member is constituted by a plate formed member mentioned above, it is not limited to the case in which the bumper reinforcement member is formed from a single plate. In the present invention, the bumper reinforcement member can be formed by combining two or more plate members. Furthermore, in the present invention, the bumper reinforcement member can be formed by combining an extruded member, a drawn molded member, and a plate member or a plate formed member.

In the aforementioned embodiments and modified embodiments, the ridge portion is formed by a single protruded Portion or two protruded portions divided in the circumferential direction. In the present invention, however, the number of dividing the ridge portion in the circumferential direction is not limited. In the present invention, for example, the ridge portion can be divided into three or more in the circumferential direction.

This application claims priority to Japanese Patent Application No. 2009-240044 filed on Oct. 19, 2009, and the entire disclosure of which is incorporated herein by reference in its entirety.

It should be understood that the terms and expressions used herein are used for explanation and have no intention to be used to construe in a limited manner, do not eliminate any equivalents of features shown and mentioned herein, and allow various modifications falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

INDUSTRIAL APPLICABILITY

The vehicle bumper reinforcement member of the present invention can be applied to a structural member in an automobile bumper, etc.

DESCRIPTION OF THE REFERENCE NUMERALS

1 bumper reinforcement member
11 outer peripheral wall
12 partition wall
15 reinforcement member hole
2 crush box
21 outer peripheral wall
22 partition wall
25a, 25b, 25c reinforce member side ridge portion
26a, 26b stay side ridge portion
27 deform originating ridge portion
3 bumper stay
36 stay hole
5 tube expansion die

The invention claimed is:
1. A method of manufacturing a vehicle bumper beam equipped with a bumper reinforcement member to be arranged along a vehicle width direction and a crush box having a tip end portion configured to support the bumper reinforcement member, the method includes:
 a step of preparing a bumper reinforcement member as the bumper reinforcement member including a reinforcement member hole penetrating at least a part of an outer peripheral wall in a fore and aft direction;
 a step of preparing a crush box as the crush box including a partition wall bridging opposed inner surfaces of an outer peripheral wall;
 a step of securing the crush box to the bumper reinforcement member by forming reinforcement member side ridge portions of the crush box at a front side and a rear side of the reinforcement member hole so as to extend in a circumferential direction by a tube expanding process using a tube expanding die with the tip end portion of the crush box penetrating the reinforcement member hole;
 a step of preparing a bumper stay including a stay hole penetrating in the fore and aft direction; and
 a step of securing the crush box to the bumper stay by forming stay side ridge portions of the crush box at a front side and a rear side of the stay hole so as to extend in a circumferential direction by a tube expanding process using a tube expanding die with a basal end portion of the crush box penetrating the stay hole; wherein the reinforcement member side ridge portions and the stay side ridge portions are simultaneously formed with the same tube expanding die.

2. The method of manufacturing a vehicle bumper beam as recited in claim 1, wherein the reinforcement member hole is formed in each of a front wall and a rear wall of the outer peripheral wall of the bumper reinforcement member, and the tip end portion of the crush box is inserted into both of the two reinforcement member holes in a penetrated manner, and wherein the reinforcement member side ridge portions of the crush box are formed at a front side of at least one of the two reinforcement member holes and at a rear side of the at least one of the two reinforcement member holes.

3. The method of manufacturing a vehicle bumper beam as recited in claim 2, wherein the reinforcement member side ridge portions of the crush box are formed at the front side and the rear side of each of the two reinforcement member holes.

4. The method of manufacturing a vehicle bumper beam as recited in claim 1, wherein the reinforcement member hole is provided only in a rear wall of the outer peripheral wall of the bumper reinforcement member.

5. The method of manufacturing a vehicle bumper beam as recited in claim 1, wherein the method further includes a step of providing a partition wall in the bumper reinforcement member so as to bridge opposed inner wall surfaces of the bumper reinforcement member.

6. The method of manufacturing a vehicle bumper beam as recited in claim 5, wherein the partition wall of the crush box is arranged horizontally at an intermediate portion in an up and down direction, wherein the partition wall of the bumper reinforcement member is arranged horizontally at an intermediate portion in the up and down direction, and wherein the partition wall of the crush box and the partition wall of the bumper reinforcement member are arranged at the same height.

7. The method of manufacturing a vehicle bumper beam as recited in claim 1, wherein the method further includes a step of forming a deform originating ridge portion protruded in a radially outward direction at an intermediate portion of the crush box in the fore and aft direction so as to extend in the circumferential direction.

8. The method of manufacturing a vehicle bumper beam as recited in claim 1, wherein the method further includes a step of forming a deform originating ridge portion by a tube expanding process using a tube expanding die at an intermediate portion of the crush box in the fore and aft direction, and wherein the reinforcement member side ridge portions and the deform originating ridge portion are simultaneously formed with the same tube expanding die.

* * * * *